No. 662,284. Patented Nov. 20, 1900.
G. A. MORRELL.
COMBINED HOE AND WEEDER.
(Application filed Mar. 22, 1900.)

(No Model.)

WITNESSES:

INVENTOR
Glenn A. Morrell
BY
ATTORNEYS

UNITED STATES PATENT OFFICE.

GLENN ALFRED MORRELL, OF GRAND RAPIDS, MICHIGAN.

COMBINED HOE AND WEEDER.

SPECIFICATION forming part of Letters Patent No. 662,284, dated November 20, 1900.

Application filed March 22, 1900. Serial No. 9,762. (No model.)

*To all whom it may concern:*

Be it known that I, GLENN ALFRED MORRELL, a citizen of the United States, and a resident of Grand Rapids, in the county of Kent and State of Michigan, have invented a new and Improved Combined Hoe and Weeder, of which the following is a full, clear, and exact description.

The invention relates to agricultural implements; and its object is to provide a new and improved combination hoe and weeder which is simple and durable in construction, very effective when in use, and more especially designed to be pushed along the ground to cut off weeds or other growth and to rapidly gather and retain the cut growth and allow the picked-up dirt to drop out, so that the implement can be handled with great ease and without fatiguing the operator, at the same time collecting the cut weeds for convenient destruction.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in both views.

Figure 1:
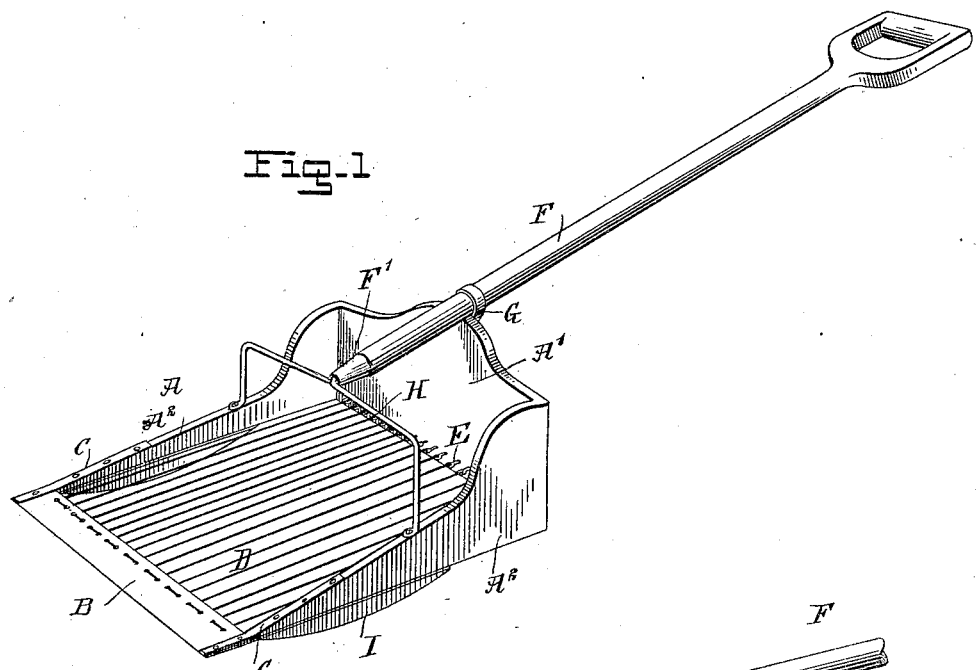
Figure 2:
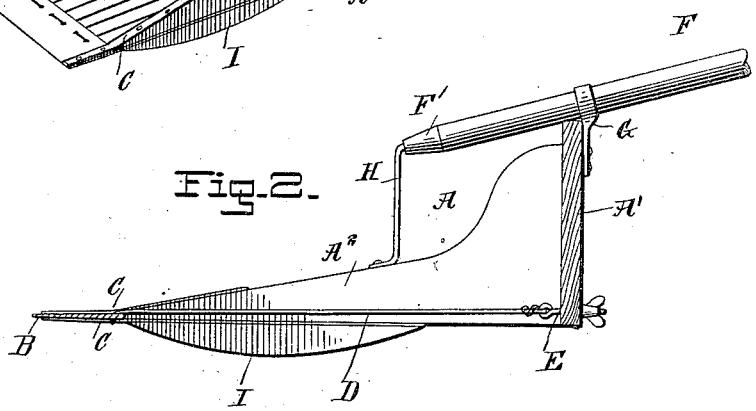

Figure 1 is a perspective view of the improvement, and Fig. 2 is a longitudinal sectional elevation of the same.

The improved agricultural implement is provided with a scoop A, having a back A' and sides A² tapering to a point at the front end, and a cutter-blade B connects the front ends of the sides with each other, as is plainly shown in the drawings, the said blade being preferably made of steel, with a cutting edge at the front to readily cut the weeds or other growth. The cutter-blade B is securely held in position on the sides A² by straps C, extending from the top and bottom of the cutter-blade to the top and bottom edges of the sides, and rivets, nails, or other fastening means connects the said straps to the blade and the sides.

The bottom of the scoop is formed of longitudinally-extending wires D, spaced suitable distances apart, so as to render the bottom perforate, to allow the dirt to readily drop out through the bottom, but to retain the cut growth in the scoop when the device is used, as hereinafter more fully described. The wires D are preferably in U form, the several strands extending parallel with each other from the blade B to screw-eyes E, held on the back A' of the scoop, so that the strands can be tightened from time to time to prevent any slack in the wires. The front or middle portion of a wire extends through apertures in the rear part of the cutter-blade, as is plainly indicated in Fig. 1, and by this arrangement a very simple perforate bottom is provided, which offers no obstruction to the incoming weeds and dirt when the implement is used.

In order to conveniently manipulate the device, a handle F is provided, extending near its front end through an eye G, secured to the upper middle portion of the back A', as is plainly indicated in Fig. 1, and the forward end of the said handle is provided with a ferrule F', engaged by a U-shaped brace H, secured to the top edges of the sides A². The latter are provided with runners I, extending a suitable distance downward from the bottom edges of the sides directly in the rear of the blade B, so that the scoop can be readily regulated on the ground by the operator manipulating the handle F accordingly to bring the cutting edge of the cutter B the desired distance below or above the level of the ground. Furthermore, the sides of the runners I hold the perforate bottom, composed of the wires D, a suitable distance above the level of the ground, so that any dirt that passes with the weeds into the scoop can readily drop through the perforate bottom back upon the ground.

In using the device the operator takes hold of the handle F and pushes the scoop forward, the runners I riding on the ground, and by raising or lowering the end of the handle the cutter B is lowered or raised according to the nature of the weeds to be cut and of the ground over which the implement is pushed. Thus the cutting edge B may be forced a desired distance into the ground or kept above the ground, if desired.

It is evident that as the scoop is pushed forward the weeds are cut by the cutting edge of the blade B and the said weeds drop into the scoop and accumulate thereon, and any dirt that is picked up with the weeds readily drops out through the perforate bottom—that is, between the wires—as before explained.

It is understood that the runners I are curved at their bottom edges, as indicated in the drawings, so as to form a fulcrum for swinging the scoop in the manner set forth and for the purpose described.

Having thus described my invention, I claim as new and desire to secure by Letters Patent—

1. An agricultural implement, comprising sides, a back, a cutter-blade at the front, spaced wires stretched from the blade to the said back to form a perforate bottom, and means, substantially as described, for taking up the slack in the said wires, as set forth.

2. An agricultural implement, comprising sides, a back, a cutter-blade at the front, spaced wires stretched from the blade to the said back to form a perforate bottom, the wires being in U shape with the middle portion secured to the cutter-blade, the several strands extending parallel from the cutter-blade to the back, and screw-eyes held on the back and engaging the rear ends of the said strands, substantially as shown and described.

3. An agricultural implement, comprising a handled scoop with a perforate bottom, and runners at the sides of the scoop to permit of regulating the scoop to raise or lower the front end thereof, substantially as shown and described.

4. An agricultural implement, comprising a scoop with a cutter-blade at the front, a perforate bottom, and runners at the sides of the scoop intermediate of the cutter-blade and the back of the scoop and extending downward below the level of the said blade, to permit of regulating the scoop on the ground and to bring the perforate bottom above the level of the ground for the dirt to fall through the perforate bottom, substantially as shown and described.

In testimony whereof I have signed my name to this specification in the presence of two subscribing witnesses.

GLENN ALFRED MORRELL.

Witnesses:
O. J. MERRITT,
GEO. L. KEARNEY.